United States Patent
Jiang et al.

(10) Patent No.: US 7,870,118 B2
(45) Date of Patent: Jan. 11, 2011

(54) SEARCH SYSTEM

(75) Inventors: Jason Jiang, Mulgrave (AU); Bhavani Laxman Raskutti, Surrey Hills (AU); Christopher David Rowles, Belgrave (AU); Simon David Ryan, Glen Waverley (AU); Wilson Wen, Wantirna South (AU)

(73) Assignee: Telstra Corporation Limited, Victoria (AU)

( * ) Notice: Subject to any disclaimer, the term of this patent is extended or adjusted under 35 U.S.C. 154(b) by 351 days.

(21) Appl. No.: 11/938,758

(22) Filed: Nov. 12, 2007

(65) Prior Publication Data

US 2008/0133508 A1 Jun. 5, 2008

Related U.S. Application Data

(63) Continuation of application No. 10/030,331, filed as application No. PCT/AU00/00797 on Jun. 30, 2000, now Pat. No. 7,296,009.

(30) Foreign Application Priority Data

Jul. 2, 1999 (AU) .................................. 1381/99

(51) Int. Cl.
*G06F 17/30* (2006.01)
(52) U.S. Cl. .................................... 707/706
(58) Field of Classification Search .............. 707/2, 707/3, 706
See application file for complete search history.

(56) References Cited

U.S. PATENT DOCUMENTS

| | | | |
|---|---|---|---|
| 5,325,298 A | 6/1994 | Gallant | |
| 5,724,033 A | 3/1998 | Burrows | |
| 5,737,734 A | 4/1998 | Schultz | |
| 5,903,892 A | 5/1999 | Hoffert et al. | |
| 5,920,852 A | 7/1999 | Graupe | |
| 5,983,220 A | 11/1999 | Schmitt | |
| 6,026,388 A | 2/2000 | Liddy et al. | |
| 6,081,774 A | 6/2000 | de Hita et al. | |
| 6,131,082 A | 10/2000 | Hargrave, III et al. | |

(Continued)

FOREIGN PATENT DOCUMENTS

WO    WO 97/12333    4/1997

(Continued)

OTHER PUBLICATIONS

Baeza-Yates, R., et al., "*Modern Information Retrieval*," Chapter 2: Modeling, Addison Wesley, 1$^{st}$ Edition, (May 1999) pp. 19-71.

(Continued)

*Primary Examiner*—Etienne P LeRoux
(74) *Attorney, Agent, or Firm*—Nixon Peabody LLP (57) ABSTRACT

A search engine and system for data, such as Internet web pages, including a query analyser for processing a query to assign respective weights to terms of the query and to generate a query vector including the weights, and an index network responsive to the query vector to output at least one index to data in response to the query. The index network is a self-generating neural network built using training examples derived from a feature extractor. The feature extractor is used during both the search and training phase. A clusterer is used to group search results.

45 Claims, 4 Drawing Sheets

U.S. PATENT DOCUMENTS

| | | |
|---|---|---|
| 6,567,810 B1 | 5/2003 | Singhal |
| 6,847,966 B1 | 1/2005 | Sommer et al. |
| 7,296,009 B1 | 11/2007 | Jiang et al. |
| 2002/0165862 A1 | 11/2002 | Richards et al. |

FOREIGN PATENT DOCUMENTS

| | | |
|---|---|---|
| WO | WO 99/05618 | 2/1999 |

OTHER PUBLICATIONS

<http://www.cs.umbc.edu/ngram/>, list entitled *"Research on N-Grams in Information Retrieval"*, Sep. 1997, pp. 1-2.

Allan, J. et al., *"Recent Experiments in INQUERY"*, Proceedings of the Fourth TREC Retrieval Conference, NIST Special Publication, vol. 500-236, (1995) pp. 49-63.

Cohen, J.D., *"Language and Domain Independent Automatic Indexing Terms for Abstracting"*, Journal of the American Society for Information Science, vol. 46(3), (1995) pp. 162-174.

Deerwester, et al, *"Indexing by Latent Semantic Analysis"*, Journal of the American Society for Information Science, vol. 41(6), (1990) pp. 391-407.

Doszkocs, *"CITE NLM: Natural Language Searching in an Online Catalog"*, Information Technology and Libraries, (Dec. 1983), pp. 364-380.

Frakes et al., *"Information Retrieval: Algorithms and Data"*, Prentice Hall (1992) pp. 363-392 and 419-442.

Grossman et al. *"Information Retrieval : Algorithyms and Heuristics"*, Kluer Academic Publishers (1998) pp. 1-132.

Harman, D., *"Ranking Algorithms, Information Retrieval: Algorithms and Data Structures"*, W.B. Frankes and R. Baeza-Yates, Prentice Hall (1992) Chapter 14, pp. 363-392.

Hearst et al., *"Reexamining the Cluster Hypothesis: Scatter/Gather on Retrieval Results,"* Proceedings from the Nineteenth ACM SIGIR Conference on Information Retrieval, (1996) pp. 76-84.

Jones et al., "Readings in Information Retrieval", Title page and table of contents, Morgan Kaufmann Publishers, San Francisco (1997).

Kwok, K.L., *"A New Method of Weighting Quay Terms for Ad-Hoc Retrieval"*, Computer Science Dept. Queens Collage, City University of New York, SIGIR '96, Zurich, Switzerland. (Special Issue of the SIGIR Forum) ACM 1996, (Aug. 18-22, 1996), pp. 187-195.

Lewis, M., *"Enquire Within: Hints on constructing a free-text database"*, Practical Computing, (1985), pp. 43-44.

O'Leary, *"The Internet, Intranets, and AI Renaissance"*, Computer Article No. 0018-9162/97 IEEE (Jan. 1997). pp. 74-78.

Rasmussen E., *"Clustering Algorithms"*, *Information Retrieval: Algorithms and Data Structures*, W.B. Frankes and R. Baeza-Yates, Prentice Hall (1992), Chapter 16, pp. 419-442.

Salton, G., *"Automatic Information Organization and Retrieval"*, McGraw-Hill (1968), pp. 84-87, 110-115, 151-153, 166-169, 235-237, 322-325 and 422-449.

Salton, G. et al., *"A Vector Space Model for Automatic Indexing,"* Communications of the ACM, (1975), pp. 18, 11, 613-620.

Salton, G. et al., *"Introduction to Modern Information Retrieval"*, McGraw-Hill (1983), pp. 118-155 and 257-301.

Salton, G., *"Automatic Text Processing"*, Addison-Wesley, Reading, Massachusetts, with reference to: Chapter 8 Entitled *"Conventional Text-Retrieval Systems"*, Chapter 9 entitled *"Automatic Indexing"*, Chapter 10 Entitled *"Advanced Information-Retrieval Models"* and Chapter 11 Entitled *"Language Analysis and Understanding"* (1989).

Salton, Gerard *"Automatic Text Processing—The Transformation, Analysis, and Retrieval of Information by Computer"*, Addison-Wesley, Cornell University (1989), pp. 303-309, 313-345 and 377-424.

Strzalkowski et al., "Natural Language Information Retrieval TREC-4 Report," Proceedings of the Fourth TREC Retrieval Conference, NIST Special Publication, vol. 500-236, (1995) pp. 245-258.

Strzalkowski et al., "Natural language Information Retrieval TREC-5 Report," Proceedings of the Fifth TREC Retrieval Conference, NIST Special Publication, vol. 500-238, (1996) pp. 391-413.

Strzalkowski et al., "Natural Language Information Retrieval TREC-6 Report", Proceedings of the Sixth TREC Text Retrieval Conference, NIST Special Publication vol. 500-240, (1997) pp. 347-366.

Van Rijsbergen, *"Information Retrieval"*, Butterworths, Department of Computing Science, University of Glasgow (1979) pp. 10-47 and 74-85.

Witten et al., *"Managing Gigabytes: Compression and Indexing Documents and Images"*, Van Nostrand Reinhold (1994) pp. 116-174.

Zobel et al., *"Exploring the Similarity Space"*, Department of Computer Science, ACM SIGIR Forum, (Spring 1998), pp. 1-17.

Willett, Peter, *Recent Trends in Hierarchic Document Clustering: A Critical Review*, Department of Information Studies, University of Sheffield, Great Britain, (Jan. 1988) pp. 577-597, vol. 24, No. 5, Information Proceeding & Management, Article No. XP000573921.

US 5,724,022, 03/1998, Burrows (withdrawn)

SEARCH SYSTEM

This application is a continuation of Ser. No. 10/030,331 filed May 24, 2002, now U.S. Pat. No. 7,296,009, and which claims the benefit of Austrian national phase filing of International Application No. PCT/AU00/00797 filed Jun. 30, 2000 and Australian patent application Serial No. PQ 1381/99 filed Jul. 2, 1999, the entire contents of which are incorporated herein by this reference.

The present invention relates to a search system and, in particular to a search engine which can model a large data set, such as web pages on the Internet, and efficiently respond to natural language queries.

Internet search engines are continually being developed to provide succinct and useful responses to queries. The task is made extremely difficult by the wide variety of data that forms the pages of the web sites accessible on the Internet using the hypertext transfer protocol (http). The search engines allow free text queries of the web pages, and generally the engines use the words of the queries for direct comparison with words held in data sets that represent the web pages. The data sets may maintain simply keywords or meta data representative of the web pages, or a more extensive list of the words of a page, as for AltaVista™. Although the engines may omit common words, such as "the", "a" and "of", the direct word comparison with the words held in the representative data sets tends to give rise to a large and unmanageable number of responses, or "hits", to a query. The accuracy and quality of the search results generated are problematic. The search engines also take no account of the actual meaning of the words in relation to the query, or the grammatical structure of the query. It therefore is desired to provide a search system or engine which alleviates these problems or at least provides a useful alternative.

In accordance with the present invention there is provided a search system, including:

query means for processing a query to assign respective weights to terms of said query and to generate a query vector including said weights; and index means responsive to said query vector to output at least one index to data in response to said query.

The present invention also provides a search engine stored on a computer readable storage medium, including:

a query analyser for processing a query to assign respective weights to terms of said query and to generate a query vector including said weights; and an index network responsive to said query vector to output at least one index to data in response to said query.

Preferred embodiments of the present invention are hereinafter described, by way of example only, with reference to the accompanying drawings, wherein.

Figure 1:
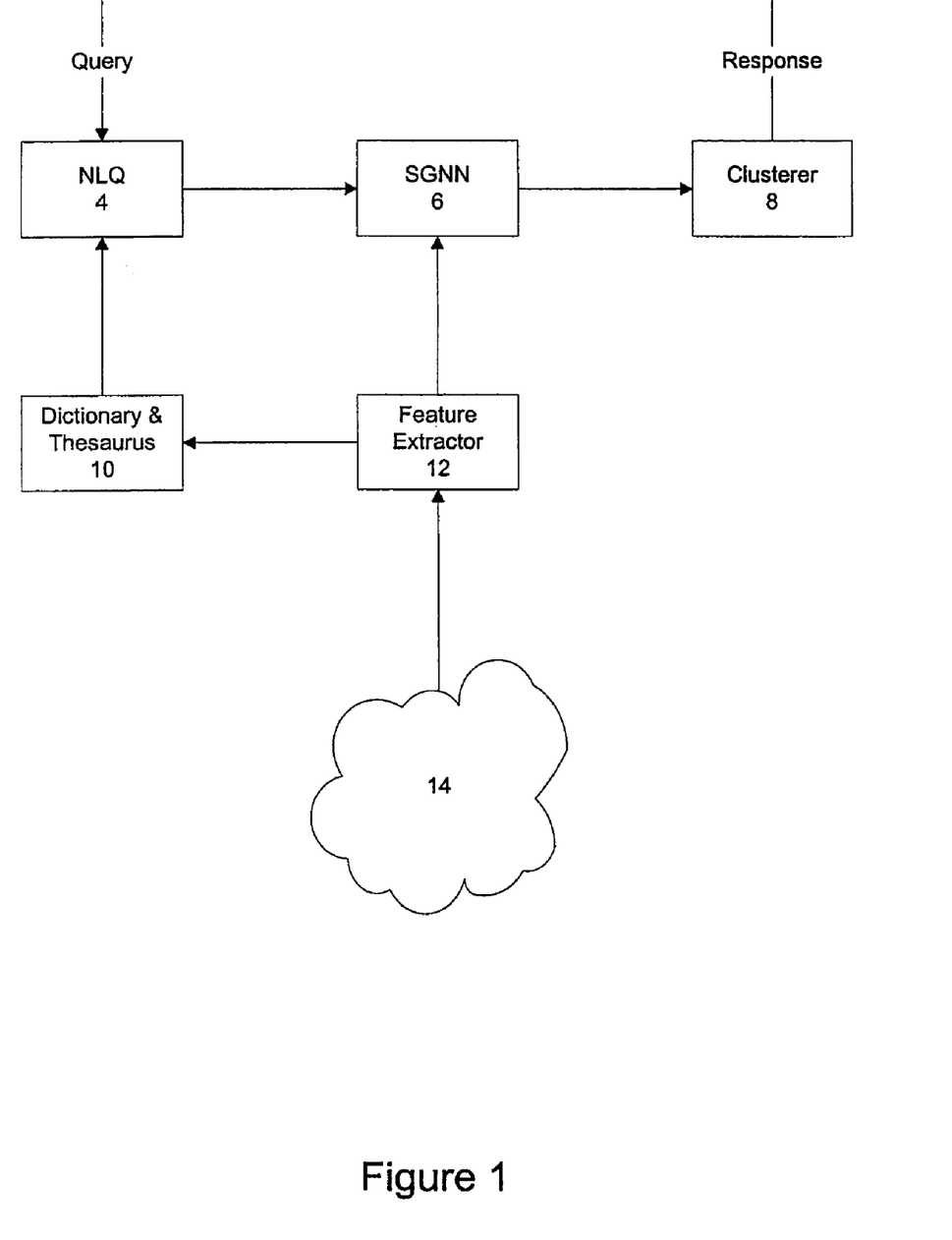
FIG. 1 is a block diagram of a preferred embodiment of a search system.

A search system, as shown in FIG. 1, includes a natural language query (NLQ) analyser 4, a self-generating neural network (SGNN) 6 and a clusterer 8. The NLQ analyser 4 receives free text or natural language queries and generates a query vector for the SGNN 6. In, response the SGNN 6 produces an index or set of indices to locations having data which would be responsive to the query. The indices are then clustered into categories, based on the content of the data at the locations indicated by the indices and formulated as a response by a clusterer 8. A feature extractor 12 accesses the data 12 that is to be the subject of all queries and the accessed data is used to train and establish the SGNN 6 which models the data 14. The terms extracted by the feature extractor 12 from the data 14 are also used in establishing a dictionary and thesaurus 10 used by the NLQ analyser 4 in generating the query vector. All of the components 4, 6, 8, 10 and 12 of the search system can be implemented as software components which are executed on a standard computer, such as a Sun Microsystems™ server, or distributed computers. If desired, some of the components can also be implemented as application specific integrated circuits (ASICs). For instance, the SGNN 6 may have its basic architecture provided by an ASIC with the parameters of the nodes of the network 6 being set by training. The components 4 to 12 establish a search engine which can be used for a wide variety of data 14, such as web pages on the Internet.

The NLQ analyser 4, as described in detail below, is able to process natural language text queries to extract only the terms of the query which are definitive of the query and most important for obtaining a satisfactory response. The NLQ analyser 4, as described in detail below, analyses the grammatical structure of a query and assigns specific weights to terms which are considered important to the query. The terms, being words or language elements, which are retained are also determined using the terms and synonyms maintained by the dictionary and thesaurus 10. For example if the query is "I want information on red cars" the NLQ analyser 4 deletes the terms "I want information on" and retains the terms which define the subject matter of the query being "red cars": The NLQ analyser 4 recognises the term "red" as an adjective and the term "cars" as the plural of the noun "car" and will assign a greater weight to the substantive noun rather than the adjective. The query vector has fields or parameters which represent every respective word held in the dictionary 10 of terms for the data 14. Once the weights are assigned for a term that weight is placed in the appropriate field in the query vector. For example, the term "red" may be assigned a weight of 0.5, whereas the term "car" may be assigned a weight of 1.0. Using this weight and vector structure, the NLQ analyser 4 can distinguish queries on the basis of syntactic structure and pass the information to the SGNN 6 in the query vector. For example, the query "glass of wine" can be distinguished between "wine glass" by assigning different weights to the terms "wine" and "glass".

The SGNN 6, as described in detail below, has a neural network structure where each of the nodes has a vector of the same format as the query vector but which is assigned weights that represents respective text of the data 14 or the child nodes of succeeding levels. The nodes which have vectors representing a respective text at a respective location also retain the index for that location as a data item. The query vector is processed by the SGNN 6 by beginning at the upper node of the network 6 and obtaining inner products between the query vector and a node vector of a node. The nodes of the network 6 are traversed only along paths where the inner products exceed a predetermined level until the highest inner products are obtained. The nodes corresponding to the highest inner products and their indices are returned to the clusterer 8 in order to formulate the response and clear content categories.

Figure 2:
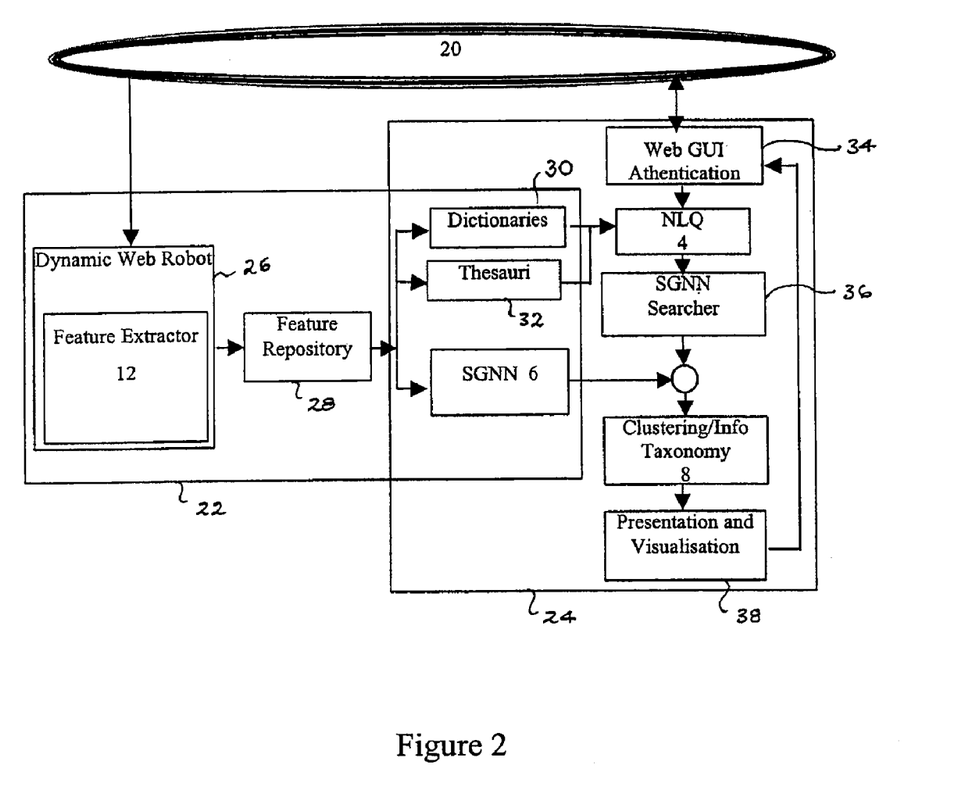
FIG. 2 is a block diagram of a preferred embodiment of a search system for web pages on the Internet.

A search system or engine for data on the Internet 20 has the architecture shown in FIG. 2. The system can be considered to include a SGNN generating module 22 and an operational module 24. The SGNN generating module 22 includes the following software components:

(i) A dynamic web robot which collects data and information from the web pages on the Internet 20.

(ii) The feature extractor 12 which extracts features, such as keywords, key-phrases, meta data and/or image/voice features, from the data collected by the web robot 26.

(iii) A feature repository 28 which receives and stores the features extracted by the feature extractor and forms training data sets or examples which are used to generate the SGNN index network 6, at least one dictionary 30 and at least one thesaurus 32, being independent or related to the domain 20.

(iv) The SGNN 6. This includes a generating mechanism, as described in detail below, which acts on the data sets held by the repository 28 to generate the index network 6. Generation of the index network 6, the dictionaries 30 and the thesauri 32 can be executed automatically off-line.

The operational module 24 is essentially an on-line module of the search system and includes the following software components:

(i) A graphic user interface and, if required, authentication mechanism 34. The interface 34 can be accessed via the Internet 20 and presents web pages to a user to enable the user to submit queries and presents the responses or results of the queries to the user.

(ii) The NLQ analyser 4. This analyses the user queries accepted by the interface 34 using the dictionaries 30 and thesauri 32. The NLQ analyser 4, as described in detail below, extracts terms, such as keywords, phrases or features, and assigns linguistic weights.

(iii) An SGNN searcher 36, which receives the feature-weight pairs produced by the NLQ analyser 4 as a query vector. The searcher 36 uses the query vector to search through the index network 6 to obtain the results to a query as a set of indices which represent locations on the Internet 20. The searcher 36 orders the results according to their relevance to the user query based on the inner products for each returned index.

(iv) The clusterer 8. This categorises the results obtained by the SGNN searcher 36 into categories so that these can be conveniently browsed by the user.

(v) A presentation and visualisation component 38 which compiles the categorised results and the category headings produced by the clusterer 8 into a web page or pages for presentation by the interface 34.

The NLQ analyser 4 receives a short passage of text (typically a sentence or two) as the query from the interface 34 and generates a structured vector suitable to pass to the SGNN searcher 36 as a query. For retrieval from a text database in English, the main task of the NLQ analyser 4 is to make use of the structure and linguistic patterns of the English text to identify terms, such as keywords/key-phrases, and assign linguistic weights to them to reflect their importance to the query. The actual weights are often application dependent, but generally those types of terms which normally carry the most important information (e.g. a noun phrase in a query as a simple example) are assigned the highest weights, while less important terms are assigned lower weights.

The NLQ analyser 4 is based on the assumption that when a person reads a sentence, he/she reads it a section at a time. For example, the sentence "I want to buy a car in Clayton" can be read:

[I want to buy] [a car] [in Clayton]

From the viewpoint of speech recognition, these sections correspond in some way to prosodic patterns. From the viewpoint of linguistic analysis, these sections represent the local linguistic structures of the sentence. Several observations about the sections are:

(a) A section typically has a structure in which there is a content word or phrase surrounded by some function words;

(b) The content word or phrase often carries the key information for that section;

(c) The category of a content word or phrase (e.g. whether it is a noun or a verb) is determined by the surrounding structure depicted by the section;

(d) The structure of a section can be described by a context-free grammar rule.

Once low level sections are recognised, they can be grouped together to form higher level sections. For example, the sections [I want to buy] and [a car] can be grouped together to form a bigger section [I want to buy a car]. Such a process can be repeated and eventually all the sections can be put together to represent the original sentence.

To execute the above process, the NLQ analyser 4 addresses the following issues:

1. Multiple matches for sections. A term may have more than one category (e.g. "rent" can be either noun or verb), then different types of sections can be generated from the word. The correct category needs to be selected.

2. Ungrammatical sentences. When people form their queries, they do not always honour the grammatical niceties of the language. Whilst syntax errors, such as subject-verb agreement, are relatively easy to handle, structural errors are more difficult.

3. Multiple interpretations of the overall structure of the sentence. By grouping low level sections in different ways, different interpretations of the sentence are obtained. The best one which depicts the structure of the sentence needs to be determined.

The above issues are further compounded by the fact that the NLQ analyser 4 has to deal with a large vocabulary in the absence of semantic knowledge.

To address the issues the NLQ analyser 4 executes a new set of techniques in the field of natural language processing, which are described below.

A data structure, referred to herein as a "key-centred phrase structure frame" is adopted to recognise sentence sections. An example of such a frame is given below for a noun phrase (NP):

$$NP \rightarrow \text{det adj*noun} \qquad (1)$$

The frame for a noun phrase section includes a determinant (det), an adjective (adj) and a noun. The category in the frame preceded by an asterisk, "noun" in this example, is the key category that will match a query term in the section. The categories are determined by accessing a dictionary 30, as described below. For a normal parser, categories in the right hand side (RHS) of a grammar rule are matched from left to right. With a key-centred phrase structure frame, however, the key category is used as an anchor to attach the frame to the word that matches this category in a sentence. Also, each element in the RHS of the frame acts as a word holder, once matched, it will hold the word that matches it plus the additional information about the word such as its morphological information. Some of the elements in the RHS of a frame may be labelled as "repeatable" or "omissible". The main advantage of this type of knowledge representation for identifying sections is to allow the NLQ analyser 4 to focus on the key information in the sentence that is possibly useful for the retrieval process.

Once a frame is attached to a word in the original sentence of a query, the key category of the frame is aligned with the word. A tolerant bidirectional pattern matching mechanism is then applied to capture the local structures that involve that word and collect information necessary for later stages.

The pattern matching process starts from the word(s) adjacent to the word to which the frame is attached. It collects the words towards the two ends of the sentence, trying to match them with the rest of the categories in the frame. This is referred to herein as "frame instantiation". The pattern matching is tolerant to structural errors in the sense that if a word in the sentence does not match the category under consideration, an attempt will be made to match the word with next category. This frame instantiation process also records additional information used by later processes, which includes:

(a) The start position of the frame, being the position of the "leftmost" word stored in the frame in the original sentence;

(b) The end position of the frame, being the position of the "rightmost" word stored in the frame in the original sentence;

(c) The covered-length, being the number of words stored in the frame; and (d) The preference, being the difference between the number of matched categories, such as noun, verb, etc., and the number of unmatched categories which are not labelled omissible in the frame.

After a new frame has been instantiated, it is compared with the existing instantiated frames to prune any redundant frames. For example, a noun phrase frame is considered to be redundant if it shares the same key word with another noun phrase but the covered-length and/or preference is less than the latter. This step can sometimes significantly reduce the number of frames to be considered in later stages therefore making the search system more efficient.

Usually, the grammar rules of a NLQ parser can be applied in any order. However, the NLQ analyser 4 adopts a partially ordered frame invocation scheme that allows the application of the frames in a flexible yet controllable manner. This is based on the understanding that the frames can be classified into different classes according to their roles. For example, a frame whose RHS contains only terminal categories such as the NP given above is used to recognise the lowest level sections. Once these lowest level sections have been recognised, another type of frame may be used to extend these sections, for example, using the rule $$PP \rightarrow prepNP \qquad (2)$$

to extend a NP into a PP (preposition phrase) in a "bottom-up" manner. A frame whose RHS consists merely of non-terminals belongs to yet another group, and is used in a top-down analysis to enforce expectations for the overall structure of the query. After defining these groups, they are applied in a particular order to gradually expand the sections from lowest level to highest level. However, with the frames in the same group there exists no order, they can be applied in any order. This frame invocation scheme provides control over how the frames are applied yet still preserves a great deal of flexibility.

Figure 3:
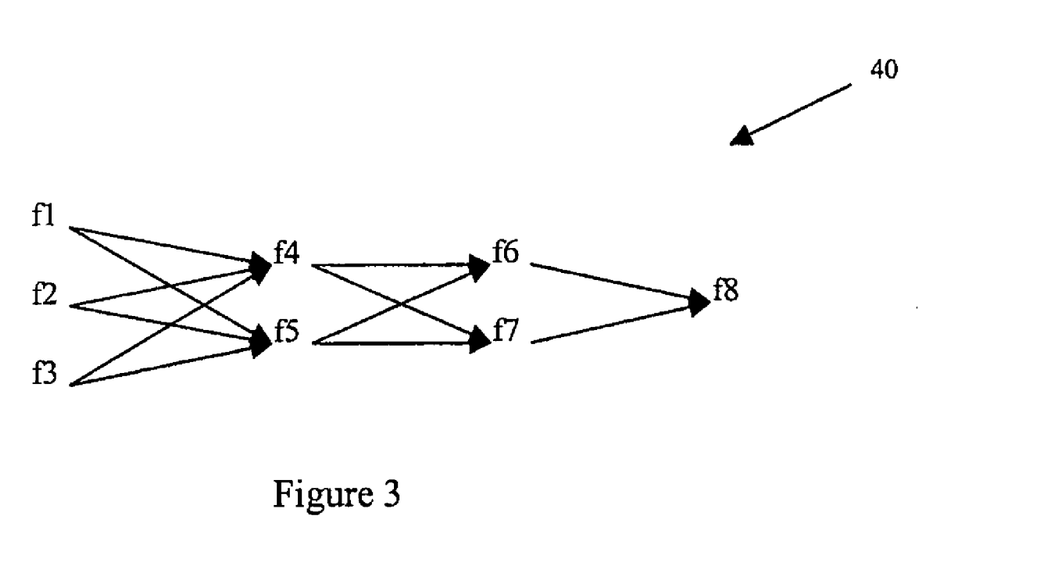
FIG. 3 is a diagram of a frame relation graph of the search system.

As mentioned above, due to the multiple senses many English words have, the pattern matching process often produces multiple instantiated frames for the local structures of the same term, some of which are pruned immediately after the matching process, but some still remain. Different ways of linking these frames lead to different interpretations of the sentence structure. To facilitate the selection of the best interpretation, a data structure referred herein as "frame relation graph" is used. The frame relation graph is an acyclic, directed graph which includes nodes, weights and links defining the relationships between the nodes. The nodes in the graph are the frames that have been instantiated by the terms or words in the sentence. As each instantiated frame represents a section in the sentence, terms "node", "frame" and "section" can be used interchangeably below in describing the NLQ analyser 4. The nodes in a frame relation graph can be separated into the following three classes:

(i) Start nodes. These are the nodes that are linked to other nodes by only outbound arrows, such as f1, f2, f3 as shown in FIG. 3;

(ii) End nodes. These are the nodes that are linked to other nodes by only inbound arrows, such as f8 as shown in FIG. 2; and (iii) Intermediate nodes. These are the nodes that are linked to other nodes by both inbound and outbound arrows, such as f4, f5, f6, f7 as shown in FIG. 3.

When linked by the arrows, a start node, one or more intermediate nodes, and an end node form a path consisting of a sequence of frames that cover some lowest level sections. For example, in FIG. 3, the nodes f1, f5, f6, f8 form a path that represent one interpretation of the sentence. The start node is always the leftmost section in the path. The end node, on the other hand, is always the rightmost section in the path. Three rules govern the formation of these paths:

(i) The end position of a node on the start point of an arrow should always be less than the start position of the node on the end point of the arrow;

(ii) A path should always try to cover as many nodes as possible;

(iii) No two paths in the graph cover the same set of nodes.

The first and second rules together ensure that only non-overlapped frames can appear in the same path, and only two nodes that represent two adjacent instantiated frames (i.e. two instantiated frames attached to the sentence adjacently) can be linked by an arrow in the graph.

Considering a very simple example of the frame relation graph, suppose a sentence contains the words $w_1, \ldots, w_{10}$ in that order, and eight frames with the following coverage:

f1((1, 3) 3), f2((2, 3) 3), f3((3, 3) 3), f4((4, 5) 4), f5((4, 5) 4), f6((7, 7) 7), f7((7, 8) 8), f8((9, 10) 10), where, f1((1, 3) 3) means that the frame f1 covers the first to the third words inclusive with the third word matches the key category of f1, then FIG. 3 shows the corresponding frame relation graph 40. The different paths given in the graph give different ways of linking the sections recognised in the sentence and the graph provides a good basis for further analysis. In this example, the sixth word is not covered by any frames. This can happen in a situation where a word cannot be accommodated by any frames such as the first "the" in "the red cars" typed in by a user by mistake. It is also possible that two frames may have different structures but cover the same section in the query. For example:

det( ) adj(red) noun(wine); and det( ) adj( ) unitn( ) prep-of ( ) adj(red) noun(wine).

Here the second frame is designed to match a phrase such as "a large bottle of red wine". The frames f4 and f5 given above correspond to this situation. They represent competing frames of which only one will be selected eventually.

Given the different paths in a frame relation graph, a strategy referred to herein as "parallel parsing and best-fit selection" is executed by the NLQ analyser 4 to decide the path that best represents the overall structure of the sentence. The parallel parsing process parses each of the paths in the graph. The parsing method executed is similar to the frame instantiation described above, and employs both "bottom-up" and "top-down" frames, with the following differences:

(a) The lowest units in the parsing process are the nodes in the path, i.e. the sentence sections recognised, not individual words;
(b) The frames applied contain key categories and are invoked only when the key category matches a node in the frame relation graph;
(c) The pattern matching is tolerant and bidirectional. It is tolerant in that if a category in the RHS of a frame is not matched, the parser will reduce the preference value for that frame but not discard that frame;
(d) During the pattern matching process, the co-occurrence of the sections involved in a frame is checked by using a set of frame correlation rules which describe legitimate linguistic relationships between sections. For example, a pronoun used as a direct object of a verb can be only in an object form such as "mine", not a subject form such as "my". This is because the co-occurrence of sections is determined not just by their syntactic categories, but also by the type of words that head them; and
(e) Syntax concord checks (e.g. subject-verb agreement) are relaxed to provide more robustness to the parsing process.

There are three possibilities for the result of the parallel parsing process:
1. Only one path gives a complete parse which represents a syntactically correct and complete sentence;
2. More than one path gives a complete parse; and
3. No path gives a complete parse.

In the first case above, the path that gives the complete parse is selected to provide the output of the NLQ analyser 4 for a query. In the second case, the output path is selected based on the following values:
(i) Total covered-length, with the higher being the better; and
(ii) Total preference, with the higher being the better.

In the third case, the original sentence is structurally ungrammatical according to the grammar rules of the NLQ analyser 4. The following additional value is then determined to select the best-fit path as the output:
(iii) The number of sections in the path, with the lower being the better.

In the second and third cases, if there is still more than one path selected after considering the values of the given parameters, which is very rare, a path is arbitrarily selected as the output when no other knowledge (e.g. contextual or domain knowledge) is available to perform further comparison.

The NLQ analyser 4 produces for any given query a nodal tree structure. The root of the tree represents the complete sentence. The terminal nodes in the tree represent the frames appearing in a selected path of the frame relation graph of the query. The intermediate nodes show how these frames are linked together to cover the complete sentence. The linguistic categories of these frames and the words contained in them, such as NP, VP (verb phrases), prep, verb, adj and noun, are used by the NLQ analyser 4 to generate weights for the terms of the sections. The thesauri 32, as described below, is used to retrieve synonyms of the terms. The query vector containing the terms, their synonyms, and their weights is then generated by the NLQ analyser 4 and passed to the SGNN searcher 36. The query vector can have the following format:

(term-list$_1$, weight$_1$, term-list$_2$, weight$_2$, ..., term-list$_n$, weight$_n$)

in which a term-list has the form (head-term, synonym, ..., synonym). As the synonyms in a term-list have the same linguistic category as that of the head term, and also because a weight is determined by the linguistic category of a term, for each term-list, the same weight can be assigned to each term in the term-list and the query vector can be implemented by assigning each term a position or field in the vector and then simply inserting the respective weight, weight$_i$. Synonyms in a term-list may however be assigned different weights. For example, "truck" may be considered to be a synonym of "car", but as the two are not strictly the same the weight assigned to "truck" as a synonym for the head term "car" may be a percentage of the weight for the head term "car". The query vector therefore simply comprises a series of weight values which are placed in a position or field corresponding to each unique term in the term-lists.

As discussed above, the NLQ analyser 4 uses key-centred phrase structure frames to capture the local structures of a user query around some potentially useful words/phrases, and then applies parallel parsing and best-fit selection to the frame relation graph to select the best interpretation of the overall structure of the query. The NLQ analyser 4 offers robustness at different levels of query analysis in an extremely simple yet effective way and with minimum syntactic knowledge. This makes the NLQ analyser 4 ideal for NLQ analysis in which both grammatical queries and ungrammatical keyword-based queries are common, and also attractive for rapid development of NLQ interfaces for large scale data sets of electronic information systems, such as the Internet. The NLQ analyser 4 is also designed in such a way that it is able to accommodate higher level knowledge such as semantic or contextual knowledge, if it is available, so that it can be applied to the applications in which an integrated NLQ analysis is required using syntactic, semantic, contextual, or even pragmatic knowledge together. With its close association with prosodic pattern recognition, the NLQ analyser 4 can also be applied to spoken language understanding tasks as well.

The dictionaries 30 include about 25,000 entries covering more than 20 parts of speech. Most of the entries contain only the root form of a word such as "car", "operate", etc. A morphological analyser is used to deal with various inflected forms of a word such as "cars" for "car" and "operated" for "operate", which expands the number of words recognisable by the NLQ analyser 4 to over 42,000. This is adequate for ordinary size general domains. For speciality domains, e.g. medicine, the dictionaries can be enhanced by domain specific terms, most of which will be nouns.

The thesauri 32 contain three manually generated thesaurus files: "thes.noun", "thes.verb" and "thes.adj". The number of entries in each of the thesauri may be for example:
thes.noun-1517 entries; thes.verb-925 entries; and thes.adj-426 entries.

The word in an entry to which a set of synonyms is attached is called a headword. In the file thes.noun, all headwords are nouns. Similarly, in the files thes.verb and thes.adj, all headwords are verbs and adjectives respectively. A headword with multiple senses is listed in multiple thesaurus files. For example, the word "rent" which can be used as both "noun" and "verb" is listed in both thes.noun and thes.verb. In thes.noun, the word "rent" is associated with the synonyms which have similar meanings when it is used as a noun, for example, "payment, rental"; in thes.verb it is associated with the synonyms which have similar meanings when it is used as a verb, for instance, "hire, lease".

Most of the headwords of the thesaurus files are carefully selected from the Webster's Thesaurus published by Book Essentials Publications, Larchmont, New York. This relatively small size thesaurus is used because it contains commonly used words and their common synonyms. However, the book does not give parts of speech of the headwords selected. Therefore, after selection, the words are checked against the Oxford Advanced Learner's dictionary to find their parts of speech and separate them into the above three different files.

The synonyms in each entry are selected by consulting both the Webster's Thesaurus mentioned above and The Macquarie Thesaurus published by The Macquarie Library Pty. Ltd. Not all the synonyms in those two thesauri for a given headwords are selected because a too rich thesaurus can cause over-expansion problems in the NLQ analyser 4 rather than assist. The average number of synonyms for an entry is about four words, with the maximum being five.

For each entry, the synonyms for the headword are ordered according to their semantic similarities to the headword. This process is somewhat subjective but is quite effective when these files are used. The ordering of the synonyms facilitates the selection of different number of synonyms for different applications.

The set of thesaurus files provides a good basis for developing application specific or domain dependent thesauri, which can be derived by editing these files during testing of the system.

A self-generating neural network (SGNN) is a hierarchical clustering network based on both concept formation, as described in K. McKusick and P. Langley, "Constrains on Tree Structure in Concept Formation", In Proc. IJCAI'91, Vol. 2, Sydney, August 1991, pages 810-816, and self-organizing neural networks, as described in T. Kohonen, "Self-Organization and Associative Memory", Spring-Verlag, 1989. The SGNN is a hybrid of conventional AI and neural networks, and exhibits the advantages of both. The SGNN:

(a) Learns from training examples (both concept formation and neural networks do);
(b) Generates the network structure automatically according to the dependence within the training data (concept formation does but neural networks don't);
(c) Learns quickly (concept formation is slow, self-organizing neural networks are quicker, but the SGNN is quicker than both); and
(d) Produces results better than both concept formation and self-organising neural networks.

A tree structure SGNN, i.e. a self-generating neural tree (SGNT) is described below.

In describing the SGNT generation procedure, the following definitions apply:

Definition 1: An instance $e_i$ is a real vector of attributes:
$e_i = <a_{i1}, \ldots, a_{in}>$.

Definition 2: A neuron $n_j$ is a ordered pair $<W_j, C_j>$, where $W_j$ is the real weight vector of the neuron:

$W_j = <w_{j1}, \ldots, w_{jn}>$, and $C_j$ is the child neuron set of $n_j$.

Definition 3: An SGNT is a tree $<\{n_j\}, \{l_k\}>$ of neurons generated automatically from a set of training instances by the algorithm given below, where $\{n_j\}$ is the neuron/node set and $\{l_k\}$ is the link set of the tree. There is a directed link from neuron $n_i$ to $n_j$, if and only if $n_j \in C_i$.

Definition 4: A neuron $n_k$ in a neuron set $\{n_j\}$ is called a winner for an instance $e_i$ if $\forall j, d(n_k, e_i) \leq d(n_j, e_i)$, where $d(n_j, e_i)$ is the distance between neuron $n_j$ and instance $e_i$.

Any distance measure can be used. For example a modified Euclidean distance measure as follows:

$$d(n_j, e_i) = \sqrt{\frac{\sum_{k=1}^{n} \rho_k \cdot (w_{jk} - a_{ik})^2}{n}}$$

where $\rho_k$ is the weight for the k-th attribute.

The SGNN 6 executes the following algorithm, described in pseudo-C code language to generate the index network of the SGNN 6. The algorithm is a hierarchical clustering algorithm.

Input:

1. A set of training instances $$E = \left\{ e_i, i = 1, \overset{[\Psi]}{\ldots}, N \right\}.$$

2. A threshold $\xi \geq 0$. [∃]
3. A distance measure for each attribute or weight in instances or neurons.

Output:

An SGNT generated from E.

Method:

copy(root, $e_0$);

```
for(i = 1,j = 1; i < = N; i++) {
    minimumDistance = distance(ex,root);
    winner = oldWinner = root;
    minimumDistance = test(e_i,root);
    if(minimumDistance > ξ) {
        if(leaf(winner)) {
            copy(n_j,winner);
            connect(n_j,winner);
            j++;
        }
        copy(n_j,e_i);
        connect(n_j,winner);
        j++;
    }
    update(winner,e_i);
}
``` where the routines are defined as follows:

(a) copy(n,e): create a neuron n and copy the attributes/weights in the instance/neuron e to n.
(b) distance(e,n): return the distance between instance e and neuron n.
(c) test(e,subRoot): find a winner in the current SGNT/sub-SGNT rooted by subRoot for instance e and return the distance between the winner and e.
(d) leaf(n): check a neuron n to see whether it is a leaf neuron in the current SGNT. A neuron in an SGNT is called a leaf neuron if it has no child neuron.
(e) connect($n_0,n_1$): connect neuron no to $n_i$ making no as a child neuron of $n_1$.
(f) update($n_i,e_{k+1}$): update the weight vector of neuron $n_i$ by the attribute vector of $e_{k+1}$ $$w_{jk,i+1} = w_{jk,i} + \frac{1}{i+1} \cdot (a_{1+1,k} - w_{jk,i})$$

according to the updating rule below.

where $w_{jk,i}$ is the k-th weight of $n_j$ after we have seen the first i examples which are covered by $n_j$ and $a_{i,k}$ is the value of the k-th attribute of i-th example covered by $n_j$.

Figure 4A:
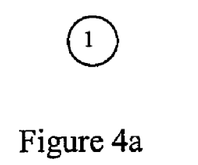
FIGS. 4a to 4e are diagrams of nodes generated during training of an index network.
Figure 4B:
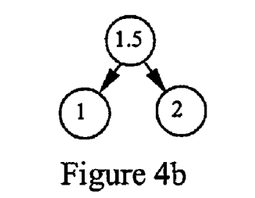
Figure 4C:
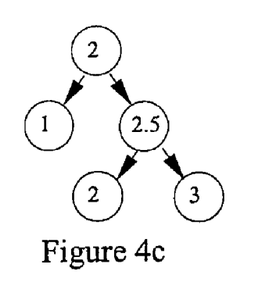
Figure 4D:
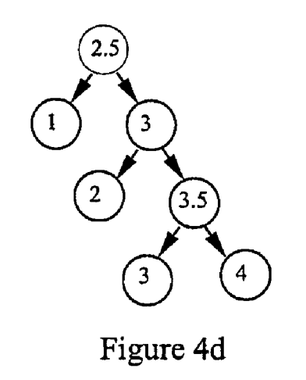
Figure 4E:
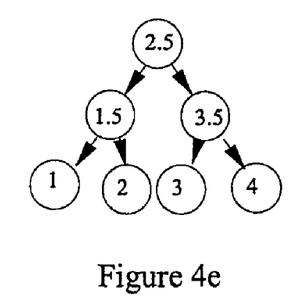

The above algorithm can be described using the following simple example, as shown in FIG. 4. At the very beginning, there is nothing in the network. Adopting a set of real numbers $\{1, 2, 3, 4\}$ as the training examples, the SGNN algorithm will take them one by one:

(1) The first example, 1, is received and the SGNN algorithm generates a neuron for it, as shown in FIG. 4a.
(2) When the next example, 2, is received, two neurons are generated. One for the example received, and another for the average of 1 and 2, 1.5, and neuron 1.5 becomes the parent node of neurons 1 and 2, as shown in FIG. 4b.
(3) When 3 is received, the algorithm calculates the distance between it and all the neurons in the network and finds out 2 is the closest one to (or the winner for) 3. The algorithm generates a new neuron for 3, calculates the average 2.5 of 2 and 3 and makes it a new parent neuron of 2 and 3, and updates 1.5 to 2 which is the average of 1, 2, 3, as shown in FIG. 4c.
(4) Finally, example 4 is received, and the algorithm finds out the closest neuron to it is 3, and updates the network as before. This produces the network as shown in FIG. 4d.
(5) To make the tree balanced and raise the classification accuracy, the network is optimized, as shown in FIG. 4e, by the methods described in E. Rasmussen, "Clustering Algorithms", In Information Retrieval (W. B. Frakes and R. Baeza-Yates ed.), Prentice-Hall, New Jersey, 1992.

It can be seen from the above, the SGNN provides efficient hierarchical indexing and classification. The data items are at the bottom of the hierarchy. All the intermediate nodes are categories or classes. The classification procedure is top down. In the above example, if a data item 1.8 is to be classified, the algorithm calculates the distances from it to the neurons level by level. In the first two level (1.5, 2.5 and 3.5), the closest neuron (winner) to 1.8 is 1.5. The calculation and comparison will continue for the sub-tree rooted by 1.5. So, the distances from 1.8 to 1, 1.5 and 2 are calculated and the winner to is found to be 2. This means 1.8 belongs to the category represented by 2.

For the SGNN 6 the training examples are extracted from web pages comprising text. The SGNN 6 adopts a SGNN learning procedure. Each keyword is assigned its own internal identification (id) value, which can be the location or index in a vector. The feature extractor 12, described below, assign weights to keywords or phrases to reflect their importance to the corresponding web pages/documents. Each final training example can be represented by $$I_c; I_k, W_k \{, I_k, W_k\}$$

where $I_c$ is the web page id, $I_k$ is keyword/phrase id, $W_k$ is the weight of the keyword, and the brackets simply represent "zero or more". A training example therefore consists of a web page id followed by one or more keyword-weight pairs.

During the query answering mode of the system, the keyword-weight pairs generated by the NLQ analyser 4 have a similar form. The only difference is there is no $I_c$.

Each neuron or node in the SGNN 6 has the following form:

$$I_c, W_c \{, I_c, W_c\}; I_k, W \{, I_k, W_k\}; P_c; P_s; [D]$$

where $W_c$ is the weight for web page $I_c$, and $P_c$ and $P_s$ are pointers to the first child neuron and the next sibling neuron of the current neuron. "[D]" stands for zero or one data item, which is an index or data item to be returned by a search of the index network. A neuron or node consists of at least one web page-weight pair followed by at least one keyword-weight pair followed by pointers to its child and sibling neurons. If the neuron is a leaf node in the SGNN, then a data item can be attached to it's end. This data item can be an index or URL to a web page, document, or advertisement depending upon the type of search engine required. The pointers are used to form a tree of the neurons that form the SGNN index network. The weight of a web page reflects the possibility that the web page is one of the answers to the current user query. If a neuron is the final winner of a search of the index network, the $I_c$'s in the neuron are sorted according to their weights and passed to the user in that order as the answer to the query. To simplify the representation, only one $I_c$ and $W_c$ pair may be used.

During the training phase, the inner product of the weight vectors of the training example and a particular neuron is calculated as a similarity measure or distances, as follows:

$$D = \Sigma W_{ke} \cdot W_{kn}$$

During the query answering mode the same inner product is calculated for the query vector and the weight vectors of the neurons to provide a similarity measure for the vectors. The weights of both vectors are normalised to a range from 0 to 1. Therefore the greater the inner product, the more similar the neuron is to the query. These values of the inner products are also used to order the results according to their similarity to the query, such that the output of the SGNN 6 is an ordered list of results:

$URL_1$, $Weight_1$
$URL_2$, $Weight_2$
. . .
$URL_n$, $Weight_n$ where $Weight_1 > Weight_2 > \ldots > Weight_n$ and are derived directly from the inner products for each neuron above a predetermined threshold level.

The feature extractor 12 is used both during generation or training of the SGNN and during the query or search process.

During the training phase, the extractor 12 extracts key terms, i.e. words and phrases (referred to as features) from each document/web page (hereinafter referred to as document) and assigns a weight to each of these features. The weight is dependent on how well that feature describes the document and brings out what is unique about the document. Thus, the input to the feature extractor is the set of documents, where each document is represented as a sequence of characters, with delimiters that break this sequence into words. The output during the training phase is a set of <feature, weight> pairs for each document, and this is used by the SGNN to generate the training examples.

During the search phase, the feature extractor 12 is used in much the same way to extract a topic name for each group of documents, where the grouping is generated by the clusterer 8, as described below. The input is a sequence of characters for each group of documents, and the output for each group is the unique feature with the highest weight for that group.

The methodology for extracting features is similar to that described in J. D. Cohen, "Highlights: Language and Domain Independent Automatic Indexing Terms for Abstracting", Journal of the American Society for Information Science, 46(3): 162-174, 1995, for generating highlights or abstracts for documents that are retrieved from a search engine.

In the extractor 12, first the distribution of "ngrams" (a sequence of characters of length n) in the document space is determined. For example, the sequence of characters "to build" will give rise to the following 5 grams "to bu", "o bui", "buil" and "build". The distribution of the ngrams over the document space is computed by counting the occurrence of ngrams in the documents. Next, each ngram is assigned a score per document that indicates how novel or unique it is for that document. Words and phrases in each document are then scored on the basis of the scores of the ngrams that make up a particular word or phrase. Thus, features that are most descriptive for a document have a higher weight.

Instead of using the feature extractor to only choose the features for documents, as described in J. D. Cohen, "Highlights: Language and Domain Independent Automatic Indexing Terms for Abstracting", Journal of the American Society for Information Science, 46(3): 162-174, 1995, the search system uses both the features and their scores during the training phase to generate the index network 6. Hence the index network 6 is based both on the correct features for each document and a weight for each feature that reflects the feature's importance in describing the document. This reduces both the noise that is input to the SGNN 6 as well as the computation cost of generating the index network.

The clusterer 8 is used during the search phase to group together related documents and reduce the information overload when a large number of results are returned by the search engine.

The clusterer 8 uses a method for grouping together related documents that follows a standard model for document clustering described in G. Salton (ed.), "The SMART Retrieval System—Experiments in Automatic Document Processing", Prentice-Hall, New Jersey, 1971. This model has three main features. First, each document is represented by a vector of word frequencies, where commonly occurring words have been excluded using a stoplist or heuristic feature selection techniques. Second, a distance measure is defined as a function of these vectors, so that the similarity or distance between any pair of documents in the vector space can be quantified. Finally, the clusterer 8 uses this distance measure to group related documents into clusters.

The clustering algorithm used by the clusterer 8 is a standard single pass algorithm that partitions the document set into disjoint sets or partitions as described E. Rasmussen, "Clustering Algorithms", Information Retrieval (W. B. Frakes and R. Baeza-Yates ed.), Prentice-Hall, New Jersey, 1992. This algorithm proceeds as follows: the first document D1 is used to initialise the first cluster C1. For each of the remaining documents, Dk is assigned to the nearest cluster Cj or a new cluster if none is sufficiently close. In order to compare documents to clusters, each cluster is represented by its centroid where the centroid represents the average of the word frequency vectors of all the documents in the cluster. A new cluster is started when none of the existing clusters are sufficiently close, where the sufficiency is determined by a specified distance threshold T.

Traditional clustering algorithms described in the E. Rasmussen article mentioned above, typically determine this threshold T a priori for a particular domain or determine the required number of clusters based on the application and then choose the threshold T that generates the required number of clusters. However, this imposes artificial constraints on the search for structure in the document set, and the clusterer 8 departs from standard techniques in that the threshold T is automatically selected to reflect the natural structure in the document set.

The automatic determination of the threshold T is done as follows. First, many different partitions of the document set are generated by varying the threshold T. Large threshold values result in a small number of general clusters while small threshold values produce a large number of more specific clusters. Next, each partition is assigned a value that indicates the quality of the partition. This value takes into account cohesion, i.e. the closeness of the documents within the same cluster as well as the isolation of different clusters. This value is the sum of the inter-cluster distances and the intra-cluster distances. The inter-cluster distance is the distance of each document from its cluster centroid and the intra-cluster distance is the distance of each cluster centroid from the global centroid (the average of the word frequency vectors of all the documents in the document set). When there is one document per cluster or when all documents are grouped into a cluster, this value takes on the maximum value, which is the sum of the distances of the documents from the global centroid. The best partition is when this value is minimised and a few compact clusters are obtained. By this process, the distance threshold T that generates clusters that reflect the natural structure of the document set is determined. Once the clusters are generated, the feature extractor 12 is used to choose a unique topic name based on the documents that make up the clusters.

Many modifications will be apparent to those skilled in the art without departing from the scope of the present invention as herein described with reference to the accompanying drawings.

The invention claimed is:

1. A search system, including:
   query means in a search computer for processing a query to assign respective weights to terms of said query based on the grammatical structure of the query and the meaning of the terms of the query and to generate a query vector including said weights;
   index means in the search computer responsive to said query vector to output indices to data in response to said query, said index means being a self generating neural network having nodes of weight vectors representing categories and terms of said data, said nodes further including pointers to other nodes, and leaf nodes of said network each including an index to said data;
   feature extraction means in the search computer for extracting said indices and respective terms of said data as term weight pairs, the weights of the pairs being based on the importance and uniqueness of component ngrams of the terms of an indexed document and the terms being extracted on the basis of the distribution of ngrams in a document space of indexed documents of said data; and
   wherein said neural network is generated on the basis of training examples including said term weight pairs, and the format of said query vectors and said weight vectors of said network is generated on the basis of said training examples.

2. A search system as claimed in claim 1, wherein the weights in said query vector are assigned based on the importance of the terms in said query.

3. A search system as claimed in claim 1, wherein said query means analyses said terms using a dictionary and thesaurus of terms of said data.

4. A search system as claimed in claim 3, wherein the query vector includes respective fields for terms of said dictionary.

5. A search system as claimed in claim 1, wherein said query means generates sections of terms which form said query, said sections representing grammatical elements.

6. A search system as claimed in claim 5, wherein the terms in said sections are allocated to grammatical categories for determining said weights.

7. A search system as claimed in claim 6, wherein said query means generates a plurality of said sections, and parses said sections to select a set of sections forming said query vector.

8. A search system as claimed in claim 7, wherein said sections are selected on the basis of syntactical structure.

9. A search system as claimed in claim 7, wherein said sections are key-centered phrase structure frames with a key grammatical category, and said query means executes frame instantiation on the terms of said query and generates a frame relation graph of said frames.

10. A search system as claimed in claim 9, wherein said query means executes parallel parsing on said frame relation graph to generate a nodal tree structure of the query to generate said query vector.

11. A search system as claimed in claim 1, wherein said weights are linguistic weights.

12. A search system as claimed in claim 1, wherein said query vector has said weights placed in respective fields corresponding to terms of at least one term list.

13. A search system as claimed in claim 1, wherein said index means compares said query vector with the weight vectors of said nodes to select said index in response to said query.

14. A search system as claimed in claim 13, wherein said comparing is executed from the upper level of the tree structure to the lower level, with paths in the structure being selected on the basis of the comparison between the vectors.

15. A search system as claimed in claim 14, wherein said index means obtains the product of said query vector and the text vector of the nodes of a level of said structure, and obtains said product for nodes of a succeeding level of said structure which are connected to nodes for which the product has exceeded a predetermined threshold.

16. A search system as claimed in claim 15, wherein the indices of nodes having a query vector node vector product higher than a predetermined threshold are output by said index means.

17. A search system as claimed in claim 1, wherein said weights are normalised, and said network is searched in response to a query by determining the inner product of said query vector and said weight vectors to locate nodes producing a high inner product.

18. A search system as claimed in claim 17, including cluster means for processing indices output by said index means in response to said query, generating term frequency vectors for data indexed by said indices, comparing similarities between the indexed data on the basis of a distance between said frequency vectors and generating content based categories on the basis of said distances and placing the output indices into said categories for display.

19. A search system as claimed in claim 18, wherein the feature extraction means receives content features of said categories from said cluster means and selects a unique descriptive feature for each category.

20. A search system as claimed in claim 18, wherein said cluster means generates a plurality of clusters of the indices and determines the quality of each cluster on the basis of inter-cluster distances and intra-cluster distances between term frequency vectors for the indices of the clusters relative to a term frequency vector centroid for each cluster.

21. A search system as claimed in claim 1, wherein the feature extraction means accesses respective unique and important terms of said data and adds said terms to said dictionary.

22. A search system as claimed in claim 1, wherein said terms represent a word or phrase.

23. A search engine stored on a computer readable storage medium, having stored thereon instructions for extracting terms from a query, comprising machine executable code which when executed by at least one machine, causes the machine to:
   generate a query analyser for processing a query to assign respective weights to terms of said query based on the grammatical structure of the query and the meaning of the terms of the query and to generate a query vector including said weights;
   generate an index network responsive to said query vector to output indices to data in response to said query, said index network being a self generating neural network having nodes of weight vectors representing categories and terms of said data, said nodes further including pointers to other nodes, and leaf nodes of said network each including an index to said data; and
   generate a feature extractor for extracting said indices and respective terms of said data as term weight pairs, the weights of the pairs being based on the importance and uniqueness of component ngrams of the terms of an indexed document and the terms being extracted on the basis of the distribution of ngrams in a document space of index documents of said data; and
   wherein said neural network is generated on the basis of training examples including said term weight pairs, and the format of said query vectors and weights vectors of said network is generated on the basis of said training examples.

24. A search engine as claimed in claim 23, wherein the weights of said query vector are assigned based on the importance of the terms in said query.

25. A search engine as claimed in claim 23, wherein said query analyser analyses said terms using a dictionary and thesaurus of terms of said data.

26. A search engine as claimed in claim 25, wherein the query vector includes respective fields for terms of said dictionary.

27. A search engine as claimed in claim 23, wherein said query analyser generates sections of terms which form said query, said sections representing grammatical elements.

28. A search engine as claimed in claim 27, wherein the terms in said sections are allocated to grammatical categories for determining said weights.

29. A search engine as claimed in claim 28, wherein said query analyser generates a plurality of said sections, and parses said sections to select a set of sections forming said query vector.

30. A search engine as claimed in claim 29, wherein said sections are selected on the basis of syntactical structure.

31. A search engine as claimed in claim 29, wherein said sections are key-centered phrase structure frames with a key grammatical category, and said query analyser executes frame instantiation on the terms of said query and generates a frame relation graph of said frames.

32. A search engine as claimed in claim 31, wherein said query analyser executes parallel parsing on said frame relation graph to generate a nodal tree structure of the query to generate said query vector.

33. A search engine as claimed in claim 23, wherein said weights are linguistic weights.

34. A search engine as claimed in claim 23, wherein said query vector has said weights placed in respective fields corresponding to terms of at least one term list.

35. A search engine as claimed in claim 23, wherein said index network compares said query vector with the weight vectors of said nodes to select said at least one index in response to said query.

36. A search engine as claimed in claim 35, wherein said comparing is executed from the upper level of the tree structure to the lower level, with paths in the structure being selected on the basis of the comparison between the vectors.

37. A search engine as claimed in claim 36, wherein said index network obtains the product of said query vector and the text vector of the nodes of a level of said structure, and obtains said product for nodes of a succeeding level of said structure which are connected to nodes for which the product has exceeded a predetermined threshold.

38. A search engine as claimed in claim 37, wherein the indices of nodes having a query vector node vector product higher than a predetermined threshold are output by said index network.

39. A search engine as claimed in claim 23, wherein said weights are normalised, and said network is searched in response to a query by determining the inner product of said query vector and said weight vectors to locate nodes producing a high inner product.

40. A search engine as claimed in claim 38 or 39, including a cluster for processing indices output by said index network in response to said query, generating term frequency vectors for data indexed by said indices, comparing similarities between the indexed data on the basis of a distance between said frequency vectors and generating content based categories on the basis of said distances and placing the output indices into said categories for display.

41. A search engine as claimed in claim 40, wherein the feature extractor receives content features of said categories from said cluster and selects a unique descriptive feature for each category.

42. A search engine as claimed in claim 40, wherein said cluster generates a plurality of clusters of the indices and determines the quality of each cluster on the basis of inter-cluster distances and intra-cluster distances between term frequency vectors for the indices of the clusters relative to a term frequency vector centroid for each cluster.

43. A search engine as claimed in claim 23, wherein the feature extractor accesses respective unique and important terms of said data and adds said terms to said dictionary.

44. A search engine as claimed in claim 23, wherein said neural network is a self generating neural network and the format of said query vectors and vectors of nodes of said network is generated on the basis of said training examples.

45. A search engine as claimed in claim 23, wherein said terms represent a word or phrase.

* * * * *